United States Patent

Maurer

[11] Patent Number: 4,465,030
[45] Date of Patent: Aug. 14, 1984

[54] TRANSMISSION HAVING A VACUUM VENTILATION CONTROL

[75] Inventor: Jerome D. Maurer, Dewitt, Mich.

[73] Assignee: General Motors Corporation, Detroit, Mich.

[21] Appl. No.: 523,271

[22] Filed: Aug. 15, 1983

[51] Int. Cl.³ .................... F02B 77/00; F16K 24/06
[52] U.S. Cl. .................... 123/198 P; 123/1 R
[58] Field of Search ............ 123/198 P, 198 R, 1 R; 74/474

[56] References Cited

U.S. PATENT DOCUMENTS 2,782,773  2/1957  Stone .................... 123/198 P
4,192,186  3/1980  Quinn .................... 73/293

FOREIGN PATENT DOCUMENTS 57-94169  6/1982  Japan .................... 123/198 P

*Primary Examiner*—Ira S. Lazarus
*Attorney, Agent, or Firm*—Donald F. Scherer

[57] ABSTRACT

A transmission includes a housing having the interior thereof connected for fluid communication with a vacuum source, such as an engine manifold. A check valve and regulator valve are disposed between the transmission housing and the vacuum source. The check valve prevents fluid flow from the vacuum source to the transmission while the regulator valve limits the maximum vacuum that can be drawn in the transmission housing. The normal transmission fill tube opening has installed therein a filter for restricting fluid flow to the interior of the housing or a cap for preventing fluid flow through the fill tube during normal operation.

3 Claims, 1 Drawing Figure

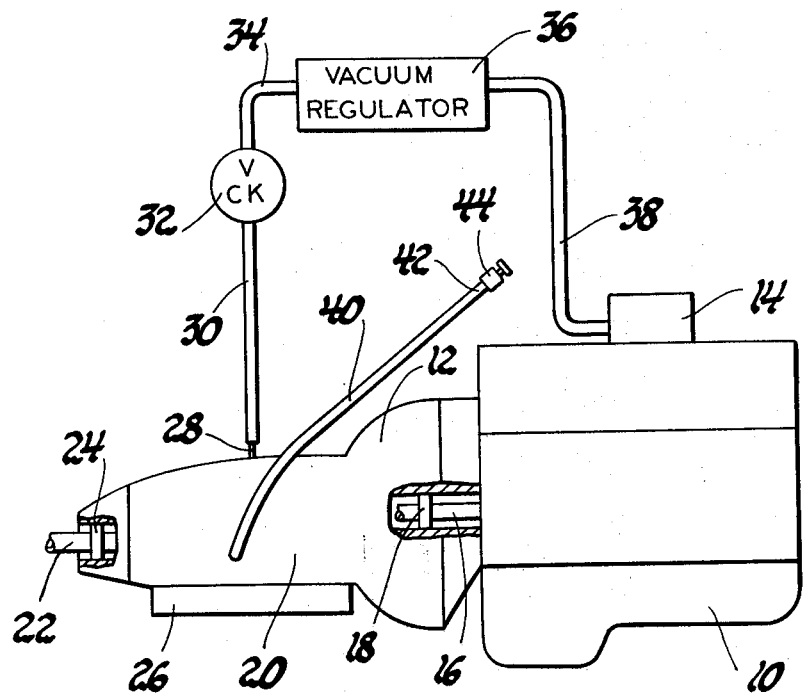

TRANSMISSION HAVING A VACUUM VENTILATION CONTROL

This invention relates to transmission venting and more particularly to vacuum controlled transmission venting.

It is an object of this invention to provide an improved transmission ventilating system wherein a vacuum source is connected to the transmission vent tube and a check valve is disposed between the transmission and the vacuum source to prevent fluid flow from the vacuum source to the transmission.

It is another object of this invention to provide an improved ventilating circuit for an automatic transmission wherein the interior of the transmission housing is connected to a vacuum source through a check valve, to limit back flow, and a vacuum regulator, to limit the maximum vacuum level in the transmission housing.

It is a further object of this invention to provide an improved ventilating control system for an automatic transmission wherein the interior of the transmission housing is connected to a vacuum source through a check valve and vacuum regulator to limit fluid flow direction and the maximum vacuum level and wherein the transmission fill tube has disposed therein a filter and restriction for limiting air flow into the interior of the transmission housing.

These and other objects and advantages of the present invention will be more apparent from the following specification and drawing which is a diagrammatic representation of a power train including an engine and a transmission.

Referring to the drawing there is seen an internal combustion engine 10 and a power transmission 12 which combine to form a vehicle power train. The engine 10 has a vacuum source 14 such as an intake manifold in the case of a spark ignition engine and a vacuum pump in the case of a diesel engine. The transmission 12 has an input shaft 16 which is surrounded by a fluid seal 18 adapted to prevent fluid communication between the interior of the transmission housing, designated 20, and the atmosphere. The transmission 12 also has an output shaft 22 which is surrounded by a fluid seal 24 also adapted to prevent fluid communication between the interior of the transmission housing 20 and the atmosphere. There are other numerous sealed surfaces on the transmission housing 20 such as the seal between the bottom pan 26 and the main portion of the transmission housing.

The transmission housing 20 has a vent tube 28 which, in conventional transmissions, is permitted to vent the interior of the transmission housing 20 to atmosphere. In the present invention, the vent tube 28 is connected through a passage 30 with a check valve 32. The check valve 32 is connected through a passage 34 with a conventional vacuum regulator 36 which in turn is connected to the vacuum source 14 through a passage 38.

The check valve 32 is a conventional valve member and is operable to prevent fluid flow from the vacuum source 14 or vacuum regulator 36 into the interior of the transmission housing 20. The vacuum regulator 36 is operable to limit the maximum vacuum which can be attained in passage 34 and therefore the interior of transmission housing 20.

As is well-known, the engine intake manifold can have vacuum levels in excess of 20 in. Hg. This vacuum level is higher than that which is necessary to vent the interior of the transmission housing 20. Accordingly, the vacuum regulator 36 can limit the interior maximum vacuum to a level of 12 in. Hg, for example.

Since the pressure level within the transmission housing 20 is less than atmosphere, it would be impossible for transmission hydraulic transmission fluid to flow passed any of the sealing surfaces such that leakage from the transmission during normal vehicle operation will be prevented.

The transmission 12 also has what is commonly termed a fill tube 40. The fill tube 40 is the housing for a ullage rod which is useful in measuring the amount of hydraulic fluid disposed within the transmission housing 20. Normally, the upper end 42 of the fill tube 40 is only loosely capped with the end of the ullage rod. With the present invention, it is preferable to provide a filter and cap 44 for closing the end of the fill tube 40. The filter provides a restriction thus limiting the air flow into the transmission housing 20 so that the desired interior vacuum can be maintained.

It is possible within the teaching of the present invention to have the cap 44 completely close the fill tube 40 since the vacuum regulator 36 limits the interior vacuum level. In such a case, the filter portion of the cap 44 would not be necessary. It is also possible to utilize just the check valve and a flow restriction in filter and cap 44 to balance the flow rates into and out of the transmission housing 20 such that the interior vacuum level can be maintained or limited to a desirable value.

The most important advantage of utilizing the present invention is the reduction in hydraulic fluid leakage from the transmission during vehicle operation. As is well-known, the sealing surfaces at seals 18 and 24 can wear during operation and permit slow amounts of leakage. With the present invention, the leakage cannot occur during vehicle operation and when the vehicle is not operating, the fluid level within the transmission is not high enough to permit the hydraulic fluid to contact the seals 18 and 24.

The embodiments of the invention in which an exclusive property or privilege is claimed are defined as follows:

1. An improvement in vented automatic transmissions for use with internal combustion engines having a vacuum source, said improvement comprising; a passage connecting the transmission vent with the vacuum source; one-way valve means in said passage for preventing fluid flow from the vacuum source to the transmission vent; vacuum regulator means in said passage between said vacuum source and said check valve means for limiting the maximum vacuum in said transmission; a fill tube on said transmission; and restrictor means on said fill tube for limiting the air flow into said transmission whereby the interior of said transmission is maintained at a pressure less than atmosphere when the engine is operating and the vacuum source is functioning.

2. An improvement in vented automatic transmissions for use with internal combustion engines having a vacuum source, said improvement comprising; a passage connecting the transmission vent with the vacuum source; one-way valve means in said passage for preventing fluid flow from the vacuum source to the transmission vent; vacuum regulator means in said passage between said vacuum source and said check valve means for limiting the maximum vacuum in said transmission; a fill tube on said transmission; and filter means on said fill tube for providing a restriction and thereby limiting the air flow into said transmission whereby the interior of said transmission is maintained at a pressure less than atmosphere when the engine is operating and the vacuum source is functioning.

3. An improvement in vented automatic transmissions for use with internal combustion engines having a vacuum source, said improvement comprising; a passage connecting the transmission vent with the vacuum source; one-way valve means in said passage for preventing fluid flow from the vacuum source to the transmission vent; a fill tube on said transmission; and vacuum limiting means including filter and restrictor means on said fill tube for limiting the air flow into said transmission whereby the interior of said transmission is maintained at a pressure less than atmosphere when the engine is operating and the vacuum source is functioning.

* * * * *